United States Patent [19]

Craig et al.

[11] 3,738,215

[45] June 12, 1973

[54] CUTOFF MECHANISM FOR STRIP MOLDING

[75] Inventors: Fred A. Craig, San Jose; Allan M. Hudson, Mountain View, both of Calif.

[73] Assignee: Thiokol Chemical Corporation, Bristol, Pa.

[22] Filed: May 28, 1971

[21] Appl. No.: 147,772

[52] U.S. Cl. .................. 83/289, 83/318, 83/490, 83/524
[51] Int. Cl. .............................................. B26d 1/56
[58] Field of Search .................. 83/289, 293, 318, 83/319, 320, 490, 524; 143/47 G

[56] References Cited
UNITED STATES PATENTS

| 2,209,995 | 8/1940 | Morris | 83/319 X |
| 2,757,734 | 8/1956 | Richardson | 83/320 X |
| 2,019,465 | 10/1935 | Rubin | 83/289 X |
| 3,543,624 | 12/1970 | Richards | 83/289 X |

*Primary Examiner*—Francis S. Husar
*Attorney*—Thomas W. Brennan

[57] ABSTRACT

Presented is an automatic cutoff machine for cutting to length strip material as it is discharged in a continuous length from an automatic machine. The cutoff mechanism includes sensing means adjustable to sense a predetermined length of strip and operable to activate a cutoff saw to cut the strip to the predetermined length. Because the strip being cut is moving, the cutoff mechanism must also move with the strip and at the same rate to preclude binding between the cutoff saw and the strip being cut.

2 Claims, 8 Drawing Figures

PATENTED JUN 12 1973

INVENTOR
FRED A. CRAIG
ALLAN M. HUDSON
BY John J. Leavitt

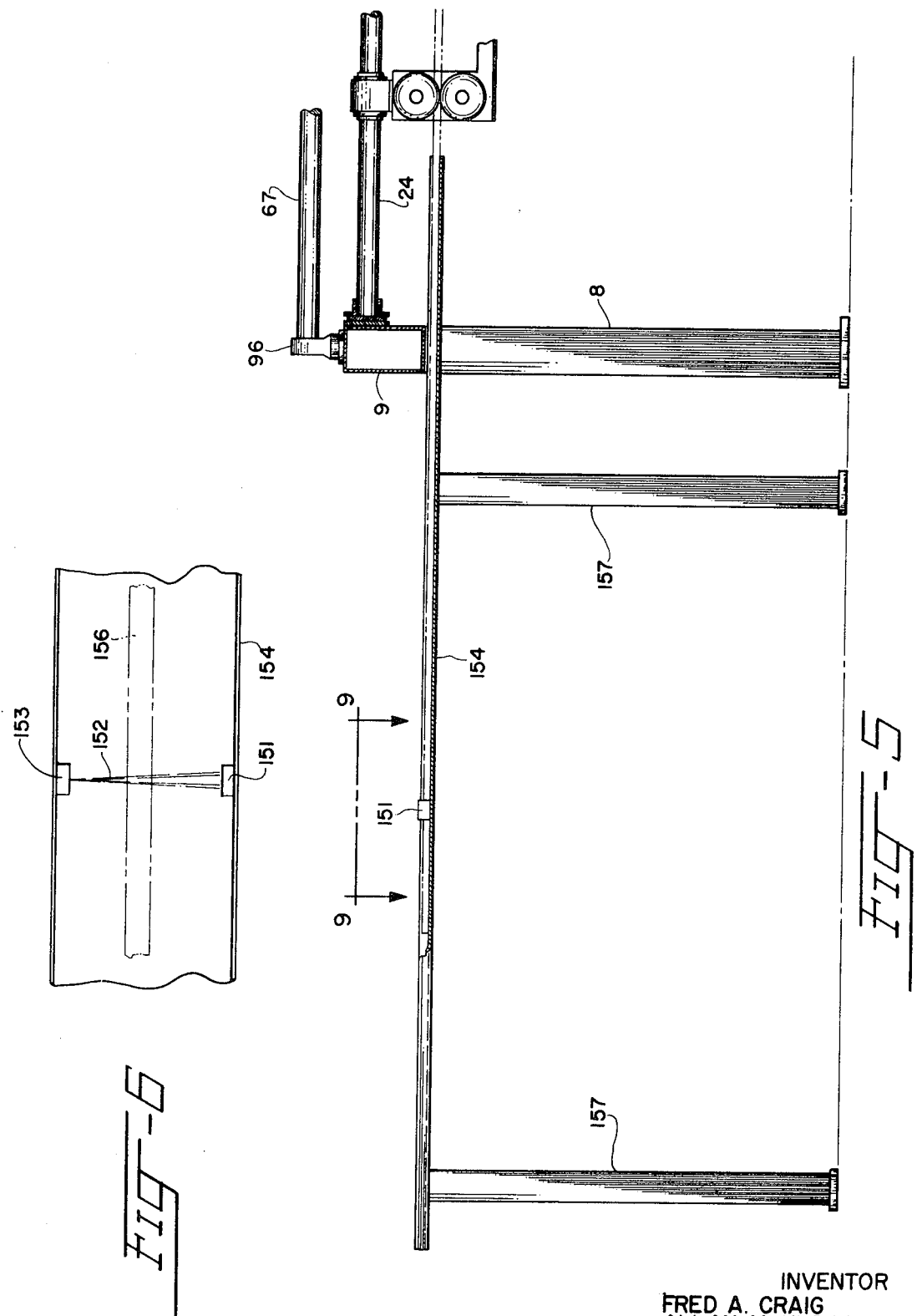

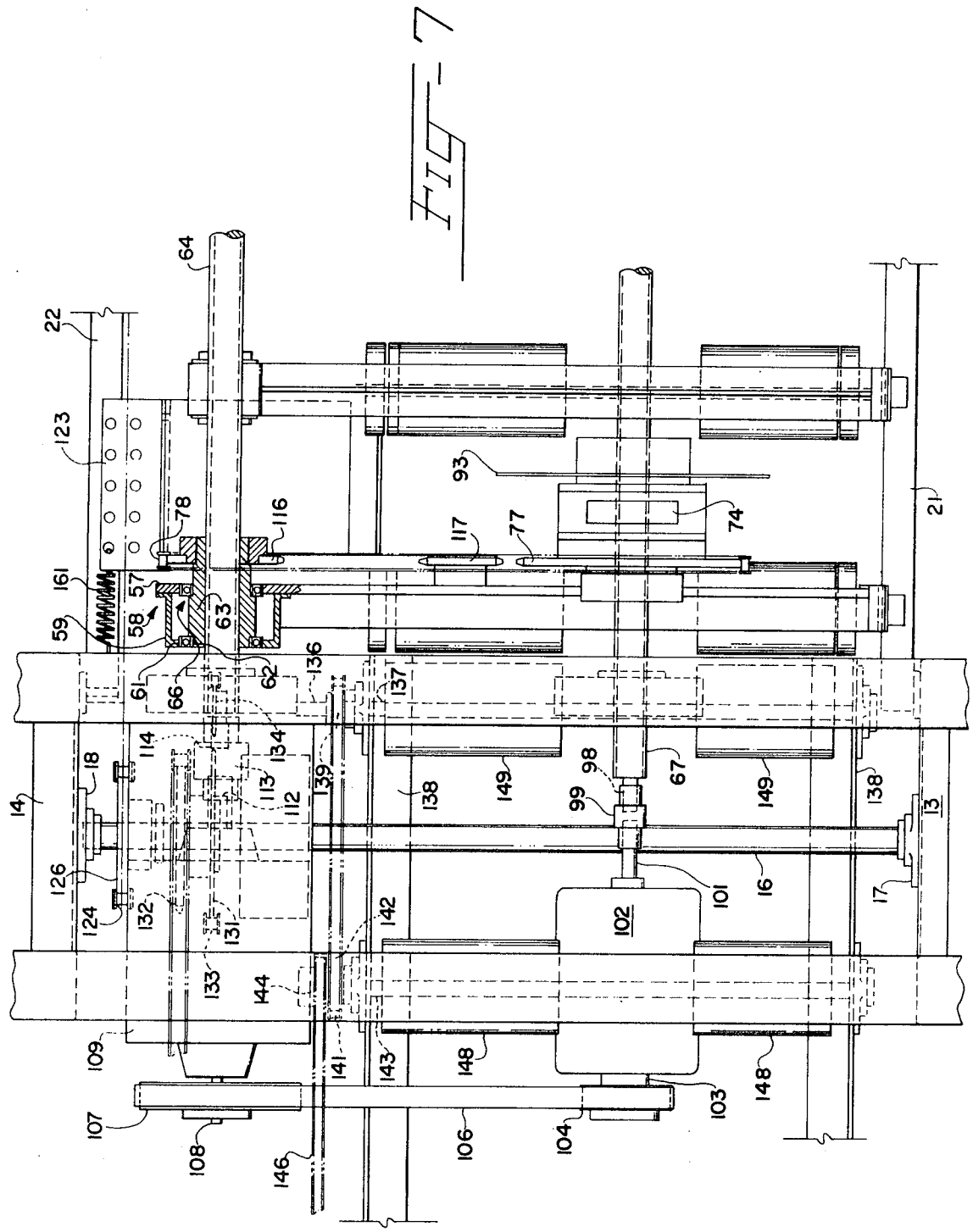

CUTOFF MECHANISM FOR STRIP MOLDING

BACKGROUND OF INVENTION

In the manufacture of many different materials in continuous and elongated rigid strips, such as molding, whether such strips be fabricated from lumber in the conventional way, or fabricated from one of the many synthetic resinous materials suitable for this purpose, the elongated rigid strips must be cut of appropriate lengths for bundling and shipment to ultimate consumers or consumer outlets. In general, rigid strip material is used for trimming around windows and doors and must, therefore, be cut to lengths that are appropriate for such use. Accordingly, it is one of the objects of the invention to provide a cutoff mechanism adjustable to cut off predetermined lengths from a continuously moving elongated strip of material.

One of the problems encountered in cutting a predetermined length from a continuously moving strip involves making the cut in such manner that the movement of the strip is uninterrupted. Accordingly, it is another object of the invention to provide a cutoff mechanism which effects its cut without interrupting the continuous movement of the strip being cut.

Another problem encountered in cutting a moving strip of rigid material is the tendency of the cutoff blade to bind in the material being cut. It has been found that such binding tendencies are precluded when the cutoff device is arranged to move with the material being cut and at the same rate therewith. Accordingly, it is a still further object of the invention to provide a cutoff mechanism adjustable to travel over a predetermined length in synchronism with the material being cut so as to preclude any tendency of binding between the cutoff device and the material being cut.

In providing a cutoff mechanism that moves with the material being cut, another problem is recovery of the cutoff mechanism and repositioning for the next operation. Accordingly, it is a still further object of the invention to provide a cutoff mechanism which not only moves synchronously with the material to be cut over a predetermined interval, but is returned to its initial position so as to initiate the next cut.

Another problem involves the overall transverse dimension through which the cut must be made. For instance, if an elongated strip three feet in width is being cut transversely, the cutting element must traverse the entire three-foot width to effect a complete cutoff. If a single circular saw blade, for instance, is moved perpendicularly through the strip being cut, it is obvious that the cutoff blade would have to exceed three feet in diameter. Since a rotating mass of such diameter would be unwieldy and dangerous, and in addition would require massive equipment for its control, thus increasing its expense, it is advantageous that the cut through the continuously moving strip, regardless of its width, be effected progressively from one edge of the strip to the other. However, where the strip is moving continuously, this poses a problem because the cut must be made rapidly and the cutting element must, of course, move with the strip being cut and simultaneously move transversely therethrough. Accordingly, it is a still further object of the invention to provide a cutoff mechanism in the nature of a rotating circular saw blade of relatively small diameter adapted to move transversely with respect to the direction of movement of the strip being cut so as to effectively traverse the material being cut from one edge thereof to the other.

BRIEF SUMMARY OF INVENTION

In terms of broad inclusion, the cutoff mechanism of the invention comprises a rigid main support frame oriented so that the elongated material to be cut passes longitudinally therethrough along appropriate conveyor means. Mounted on the main frame is an auxiliary carriage also adapted to move longitudinally along the main support frame at a rate equal to the material to be cut. To effect cutting of the material, there is mounted on the auxiliary carriage frame for movement therewith in synchronism with the material to be cut, cutoff means mounted on the free end of a rotatable cantilever arm. Appropriate sensing and control means, actuated by movement of the product through the main frame and by movement of the auxiliary carriage in synchronism with the product being cut, effects energization of a drive mechanism for effecting rotation of the cantilever arm on which the cutoff means is mounted.

BRIEF DESCRIPTION OF DRAWING

FIG. 5 is a side elevational view of the discharge means for sensing and activating the cutoff means.

FIG. 6 is a plan view of the sensing means of FIG. 8 taken in the direction of the arrows in line 9—9 in FIG. 8.

FIG. 7 is a plan view of the cutoff mechanism, a portion being broken away to reduce its length.

DESCRIPTION OF PREFERRED EMBODIMENT

In terms of greater detail, the cutoff mechanism for strip material is described hereinafter in relation to its use for cutting off to specific lengths plastic strip material produced continuously in strip form. It should be understood, however, that the cutoff mechanism may be used to cut to length any material or product that is manufactured in elongated form.

Figure 1:
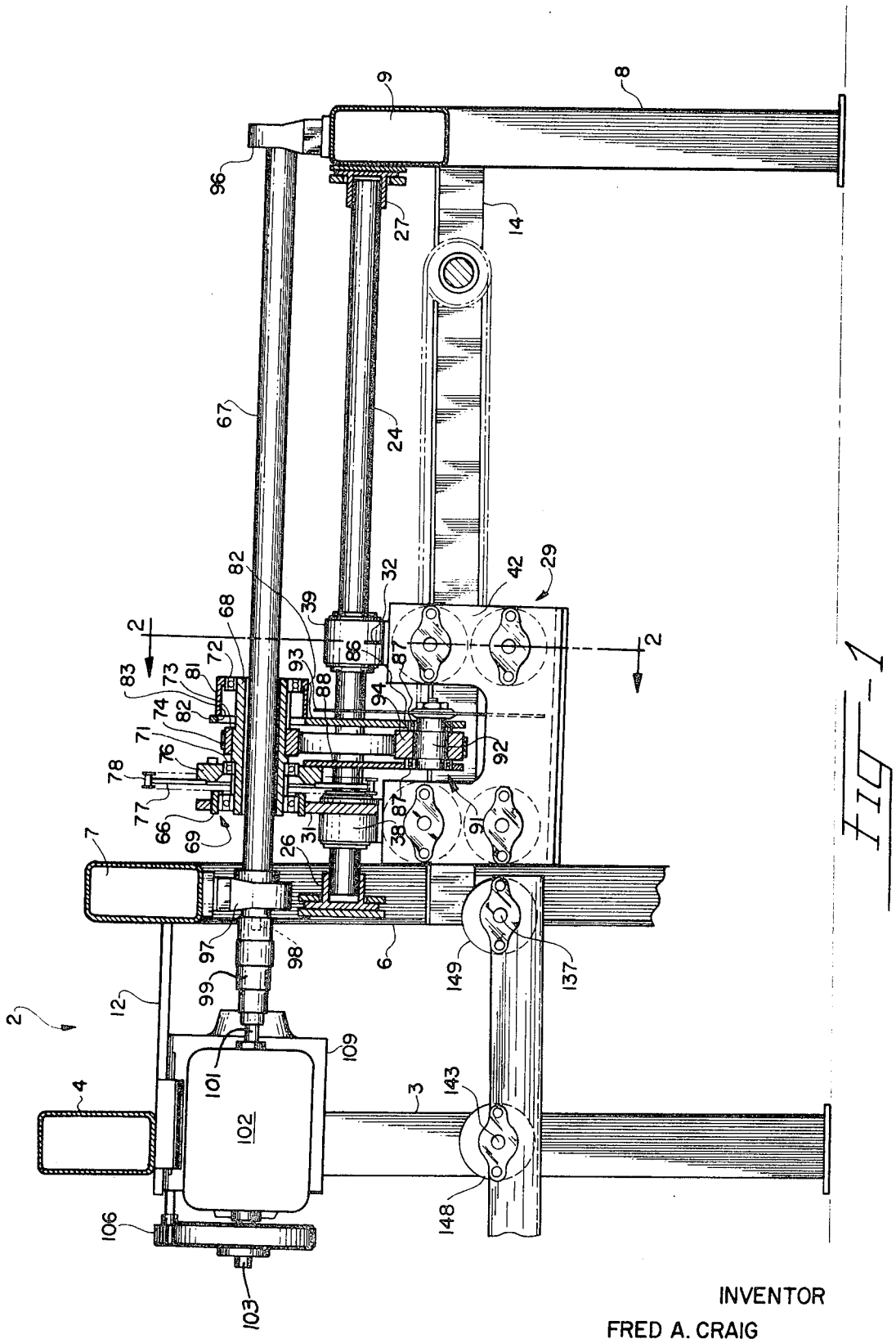
FIG. 1 is a side elevational view of the cutoff mechanism, partly in vertical section, portions of the frame being broken away to reduce its size.

Referring to FIG. 1, there is shown a main support frame designated generally by the numeral 2, and including a motor support standard having vertical legs 3 formed from structural iron connected at their upper ends by a cross beam 4 so as to form an inverted U-shaped standard on which appropriate drive means may be suspended, as will hereinafter be explained. Spaced longitudinally from the motor support standard and standing substantially parallel thereto is an auxiliary carriage standard including vertical legs 6 connected at their upper ends by a cross beam 7, the upstanding legs 6 and beam 7 forming an inverted U-shaped standard cooperating with a similarly configured but lower discharge end standard having vertically upstanding legs 8 connected by a cross beam 9.

Rigidity as between the plurality of axially spaced standards is provided by appropriately interposed structural elements such as tie plate 12 (FIG. 1) extending between cross beams 4 and 7 adjacent the upper ends of these standards, and longitudinally extending stringers 13 and 14 (FIGS. 1 and 7) spaced intermediate the ends of legs 3 and 6 and welded therebetween so as to form a rigid interconnection of pairs of legs 3 to pairs of legs 6. The longitudinally extending stringers are conveniently angle bars one web of each of which is vertically disposed to form a support surface for a transversely extending shaft 16, rotatably journaled in appropriate bearings 17 and 18 bolted respectively to longitudinally extending stringers 13 and 14.

The discharge standard formed by vertical legs 8 and cross beam 9 is connected to the intermediate standard 6-7 by longitudinally extending angle bars 21 and 22, the angle bars being used to support various structures as will hereinafter be explained. Also connecting the intermediate standard 6-7 with the discharge standard 8-9 is a longitudinally extending guide rail 23 (FIG. 2) providing opposed flat surfaces 24 and 26 forming guide and support surfaces upon which associated structure may move longitudinally of the rail. Such associated structure, as will hereinafter be explained, is also supported adjacent the opposite side of the main frame on a longitudinally extending slide shaft 24, opposite ends of which are supported in appropriate bearings 26 and 27, the bearing 26 being fixed to one of the legs 6 and the bearing 27 being fixed as indicated in FIG. 1 to the cross beam 9.

Figure 2:
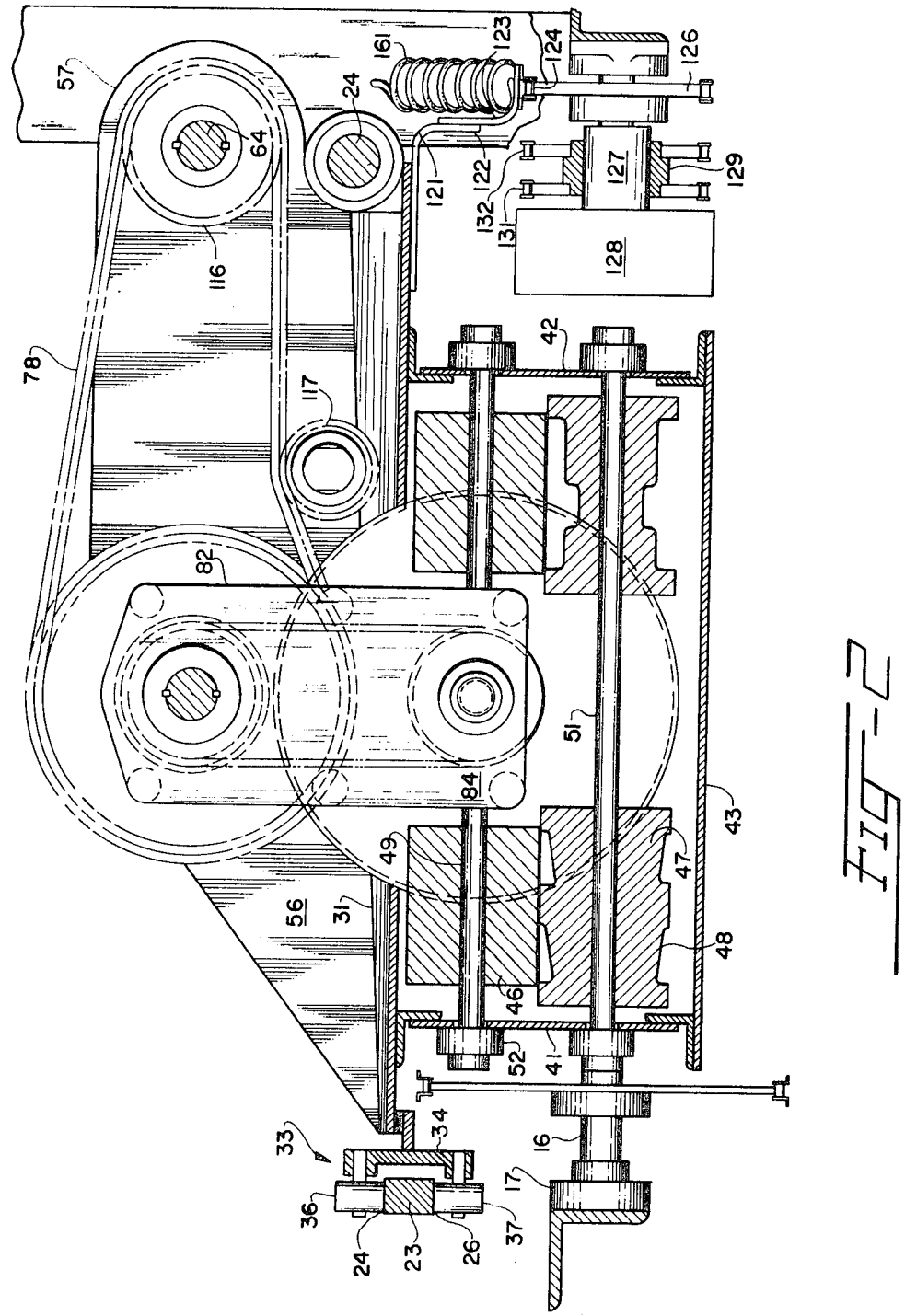
FIG. 2 is an enlarged vertical cross-sectional view taken in the plane indicated by the line 2—2 in FIG. 1.
Figure 3:
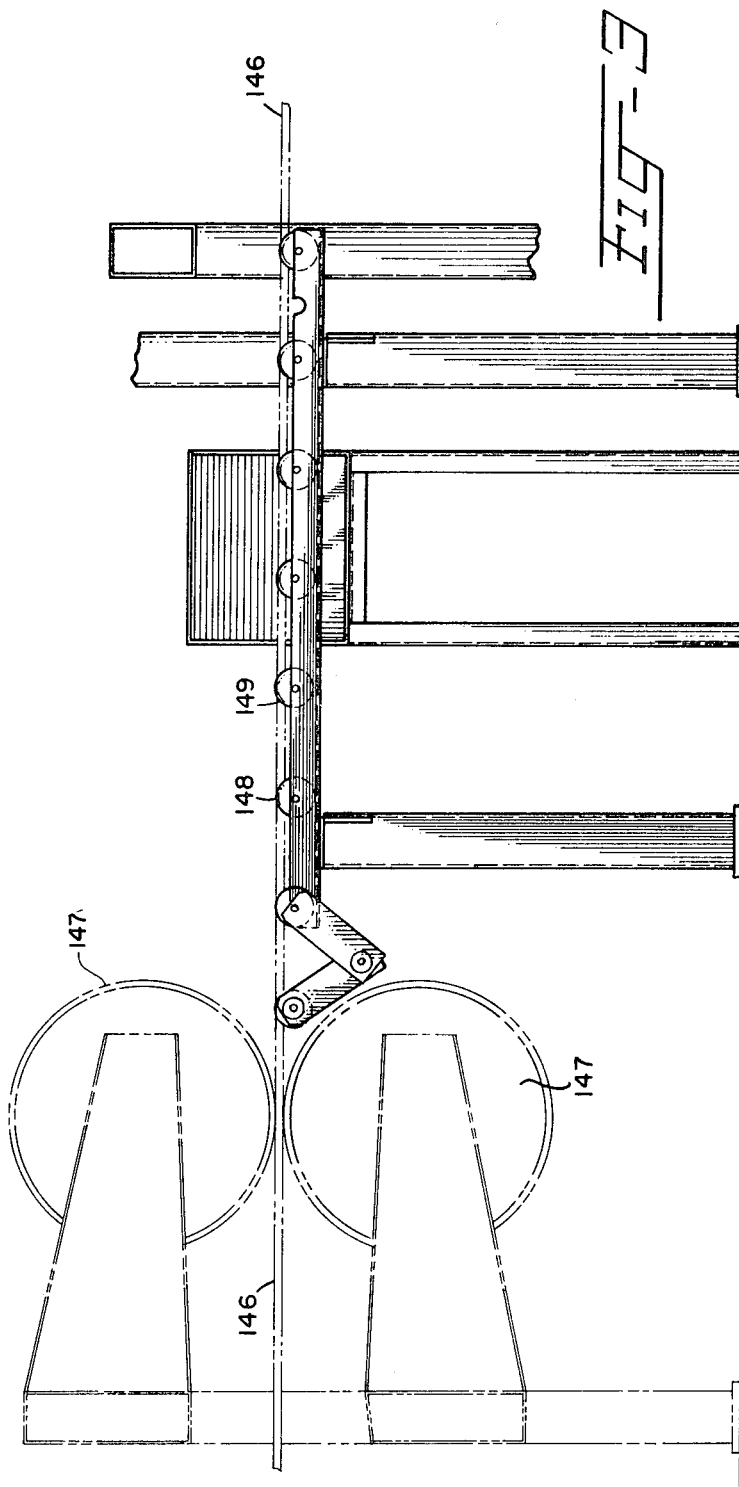
FIG. 3 is a side elevational view illustrating the transition between the discharge end of the strip forming apparatus and the cutoff mechanism forming the subject matter of this invention, illustrating the means to effect cooling of the product emanating from the strip forming apparatus.
Figure 4:
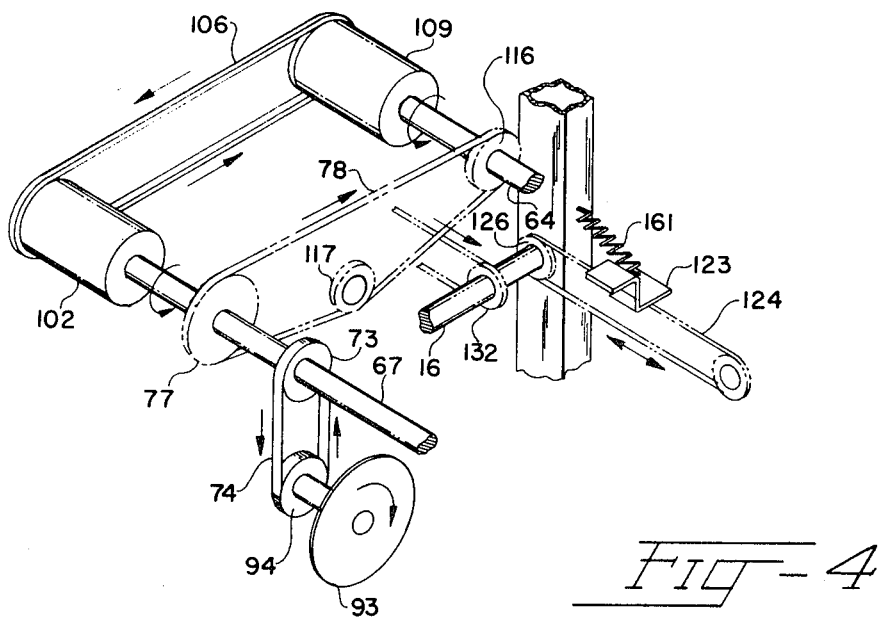
FIG. 4. is a schematic view in perspective illustrating the mechanical and functional relationships between the main frame auxiliary carriage, cutoff means and drive for the cutoff means.

Supported on the guide bar 23 and slide shaft 24 is an auxiliary carriage frame designated generally by the numeral 29. The auxiliary carriage is provided with transversely extending beams 31 and 32, both beams at corresponding ends adjacent the guide bar 23 being provided with a roller bearing assembly designated generally by the numeral 33 and including a bracket 34 on which rollers 36 and 37 are rotatably journaled as shown. Referring to FIG. 2, it will be seen that roller 36 on each beam is adapted to roll along the upper surface 24 of the guide rail 23, while the roller 37 is adapted to roll along the surface 26 of the guide rail 23. At their other ends, the beams 31 and 32 terminate in appropriate sleeve type bearings 38 and 39 slidably journaled on the slide shaft 24. It will thus be seen that by virtue of the slidable engagement of the bearings 38-39 on slide shaft 24 and the rolling contact between rollers 36-37 and the guide rail 23, the auxiliary carriage is permitted to move longitudinally of the main frame within predetermined limits as will hereinafter be explained.

The auxiliary carriage also includes a housing portion formed by depending side walls 41 and 42, preferably generally U-shaped as indicated in FIG. 1, the lower ends of the U-shaped side walls being connected by a bottom wall 43 as shown in FIG. 2. Mounted within the housing formed by walls 41-43 are a plurality of pairs of guide rollers 46-47, the roller 47 of each pair being provided with a suitable surface configuration such as recess 48 to accommodate the configuration of the strip material being run through the cutoff mechanism. The opposing roller 46 of that pair is either provided with a smooth exterior periphery or is provided with a recess complementary to a projecting portion of the configuration being run. It should of course be understood that these rollers may be removed and others of different configuration substituted therefor.

As viewed in FIGS. 1 and 2, there are four such pairs of rollers supported within the auxiliary carriage housing. Rollers 46 of each pair are journaled for free rotation on shafts 49, while opposing rollers 47 of each pair are journaled for free rotation on shaft 51. As shown in FIG. 2, shafts 49 and 51 are appropriately supported at each end on bearings 52 fixed to side walls 41 and 42.

Supported on the transversely extending beam 31 (FIG. 2), and forming a part thereof, is a vertically extending journal plate 56 in the nature of a gusset, one end 57 of which supports a bearing assembly designated generally by the numeral 58 (FIG. 7) and including an outer housing 59 equipped with an outer bearing race 61 cooperating with an inner bearing race 62 press fitted on the outside periphery of a slide bearing sleeve 63 appropriately keyed for longitudinal sliding movement along a rotatable shaft 64. The shaft 64 extends longitudinally of the main support frame, being positioned slightly above slide shaft 24 as indicated in FIG. 2. To lend further support to the slide bearing sleeve 63, the outer end portion 57 of the plate 56 is apertured coaxial to the shaft 67 and is provided with a bearing assembly designated generally by the numeral 66 and including inner and outer races as shown. From the foregoing, it will be apparent that as the auxiliary frame moves longitudinally along the guide bar 23 and slide shaft 24, the journal plate 56 moves with the auxiliary carriage while being slidably supported as previously described.

The midsection of the vertically extending journal plate 56 is apertured as shown in FIG. 1 and is provided with a bearing support sleeve 66 press fitted in the opening. The opening in the journal plate 56 coaxially accommodates a shaft 67, preferably splined for reasons which will hereinafter appear, and on which shaft is slidably disposed a hub 68. Since it is not desirable that the hub rotate in relation to shaft 67, the hub preferably includes splines complementary to the splines of shaft 67. The hub is rotatably disposed coaxially within the bearing sleeve 66, and is supported in this position by an appropriate bearing assembly 69.

The hub 68 also supports a bearing assembly 71 disposed intermediate the ends of the hub, and bearing assembly 72 press fitted on the opposite end of the hub from bearing assembly 69. Between bearing assemblies 71 and 72 there is provided a sheave or pulley 73 adapted to receive a flexible, drive belt 74 as shown in FIG. 1. With respect to bearing assembly 71, there is mounted for rotation with the outer race of this bearing assembly a mounting bracket 76, preferably annular in configuration and having attached to its outer periphery a large diameter sprocket 77 for reception of a roller chain 78.

It will thus be seen that since the hub 68 is splined to shaft 67, rotation of the shaft effects rotation of the hub in relation to the bracket 76 and sprocket 77. On the other hand, since the bracket 76 and sprocket 77 are attached to the outer race of the bearing assembly 71, this assembly may be rotated about the axis of shaft 67 without rotation of the shaft.

Rotatably mounted on the bearing assembly 72 for rotation in relation to the shaft 67 is a journal sleeve 81 on one end of which is secured as by welding a mounting plate 82 having an aperture 83 therein concentrically disposed about the hub 68, and having its adjacent peripheral portion welded to one end of the sleeve 81. As seen in FIGS. 1 and 2, the plate 82 extends away from the bearing sleeve 81 in the nature of a cantilever arm and on its free end portion 84 is provided with an aperture 86 within which is mounted a bearing assembly 87.

As seen in FIG. 1, a similar support plate 88 lies parallel to and spaced behind plate 82, and plate 88 is also provided with an aperture 89 axially aligned with the aperture 86 and also utilized to support a bearing assembly 91. Suitably mounted in the two bearing assemblies 87 and 91 is a mandrel 92 carrying a saw blade 93 on one end thereof and a sheave or pulley 94 keyed to the mandrel and disposed between plate 82 and 88. Drive belt 74 connects pulley 73 and pulley 94 to effect continuous rotation of saw blade 93.

As indicated above, since pulley 73 carrying drive belt 74 is keyed to hub 68, and since the hub is in turn splined to shaft 67, rotation of shaft 67 will necessarily result in rotation of pulleys 73 and 94 and consequently, the saw blade 93. To effect rotation of shaft 67, the shaft at one end is journaled for rotation in a bearing 96 supported on the standard 8–9, while at its other end the shaft is journaled in a bearing assembly 97 detachably secured to the intermediate standard 6–8. The end of the shaft associated with the bearing 97 is provided with a reduced-in-diameter section 98 engaged by a coupling member 99 which is also adapted to engage the shaft 101 of a drive motor 102.

The drive motor is conveniently a 1 HP double-shaft type with the second shaft 103 projecting from the opposite end of the motor housing and supporting a pulley 104 adapted to carry a gear belt 106 for the transmission of power between the motor 102 and a second pulley 107 mounted on the shaft 108 of a power unit 109 equipped with a power takeoff shaft 112 engaging a coupling 113, the other end of which engages the reduced-in-diameter portion 114 on the associated end of shaft 64. As previously noted, shaft 64 carries hub 63, carrying the bearing assembly 58 associated with the longitudinally movable auxiliary carriage 29. Also mounted on hub 63 as by press fitting thereon, is a sprocket 116 connected by roller chain 78 previously discussed to sprocket 116 connected by roller chain 78 previously discussed to sprocket 77 journaled on the hub 68. Slack in the chain 78 is taken up by an idler sprocket 117 as shown best in FIG. 2.

It will thus be seen that when the electric motor 102 is energized, shaft 67 is caused to rotate, thus rotating hub 68. Rotation of hub 68, of course, results in driving pulley 73, thus causing rotation of saw blade 93 which rotates continuously at constant speed so long as motor 102 is energized.

Energization of motor 102 also causes rotation of drive belt 106, effecting rotation of shaft 108 in the power unit 109. This power unit is conveniently a Warner Electropak sold as Model No. EP-500 and includes clutch and brake means actuated and controlled in a manner which will hereinafter be explained. It should be noted that with shaft 108 of the power unit 109 rotating, shaft 64, axially aligned with the drive shaft of the power unit, does not rotate unless the brake incorporated in the power unit is released and the clutch engaged so as to complete a power path through the power unit. When that occurs, the power unit causes rotation of shaft 64 and hub 63 splined thereto.

Since sprocket 116 is press fitted or keyed to hub 63, this sprocket will be caused to rotate with shaft 64, thus effecting rotation of sprocket 77, causing the bearing bracket 76, bearing sleeve 81, and attached support plates 82 and 88 carrying mandrel 92 to swing in an arc around the axis of the shaft 67 on which they are mounted. It will thus be seen that continuous rotation of the saw blade 93 continues at whatever speed is provided by the drive ratios between the motor and mandrel 92, while the entire saw unit carried on the cantilever arm 84 will be caused to rotate in an arc about the axis of shaft 67.

As viewed in FIG. 2, swinging movement of the rotating saw blade in an arc about the shaft 67 will carry it in an orbital path which extends through any elongated material carried on the rollers 47 of the auxiliary carriage 29. The manner and means for controlling such movement of the saw blade in an arc about the shaft 67 will be explained in greater detail hereinafter in conjunction with FIGS. 1, 2, 5 and 7.

To effect longitudinal displacement of the auxiliary carriage 29 in relation to the main support frame, and specifically longitudinally of the support and guide bar 23 and slide shaft 24, the auxiliary carriage is provided with a laterally extending bracket 121, the free end 122 of which is detachably bolted to an anchor bracket 123 anchored by any suitable means to a roller chain 124. The roller chain is carried by a sprocket 126 normally adapted to rotate freely on the shaft 16, and being provided with an elongated hub 127 which connects the sprocket 126 to a magnetically operated clutch mechanism 128, including the hub 127, and provided also with a drive sleeve 129 arranged coaxially about the hub 127 and on which are fixedly mounted a pair of sprockets 131 and 132.

The sprocket 131 is connected by a roller chain 133 to relatively smaller sprocket 134 keyed to the end portion 136 of a shaft 137 journaled adjacent the discharge end 138 of a pair of elongated stringers formed by angle bars and which form a part of a conveyor to deliver elongated material to the cutoff mechanism. The shaft 137 also supports, outboard of one of the elongated stringers 138 and keyed to the stub shaft 136 of the shaft, a sprocket 139 connected by a roller chain 141 to a sprocket 142, keyed to shaft 143 together with companion sprocket 144, as shown. Shaft 143 is journaled on the stringers 138 at a point spaced from shaft 137 as illustrated in FIG. 1.

The sprocket 144 is connected by an appropriate roller chain 146 with a drive sprocket (not shown) connected to one of the drive pulleys 147 of the apparatus in which the elongated material is being formed and from which it is being discharged at constant rate. It will thus be seen that regardless of the speed of the discharge pulley 147 of the forming apparatus, chain 146 drives shafts 143 and 137 at a proportionate rate so that the material to be cut passes into the cutting mechanism at the same rate as it emerges from the forming apparatus. To insure such continued movement of the material to be cut, shafts 137 and 143 are provided with appropriate pairs of drive rollers 148 and 149. These drive rollers are generally in line with and complement rollers 47 carried in the auxiliary carriage 29.

It will thus be seen that since sprocket 134 is mounted on the same stub shaft 136 on which sprocket 139 is mounted, rotation of sprocket 139 effects rotation of sprocket 134, which by virtue of its connection with sprocket 131 by roller chain 133, effects rotation of the control sleeve 129 on hub 127. Normally, such rotation of the control sleeve is free and at a rate proportional to the rate at which the feed rollers 148 and 149 are rotated. At selected times, however, when it is desired that the cutoff blade be energized and the auxiliary carriage move longitudinally of the main frame to effect a cutoff operation, the magnetically operated travel clutch 128 is energized by appropriate control means to be described hereinafter, so that an instantaneous and releasable interconnection is formed between the sprocket 132 and sprocket 126.

This results in sprocket 126 being rotated at the same rate as drive rollers 148-149-46-47 and, since the roller chain 124 driving sprocket 126 is fastened through anchor bracket 123 to the auxiliary carriage 29, it will be seen that the auxiliary carriage moves longitudinally of the main frame at the same rate at which the roller chain 124 is driven by the sprocket 126. Thus, when the power unit 109 is activated so as to drive the cantilever saw arm 84 in an arc about the shaft 67, the saw blade moves longitudinally of the main frame at the same rate as the auxiliary carriage 29. There is, therefore, no tendency for the saw blade to bind in the material through which it is passing, inasmuch as the saw blade and material being cut are moving longitudinally through the frame at the same rate.

Figure 8:
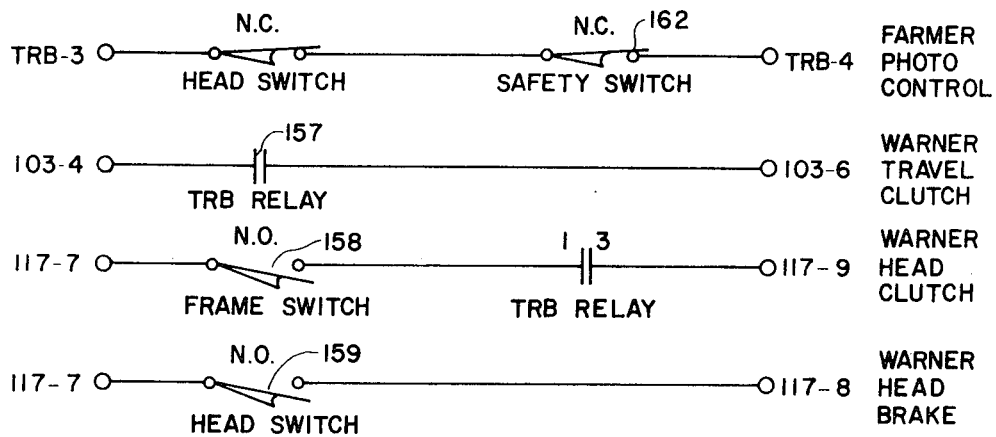
FIG. 8 is a diagrammatic view of the control wiring for the cutoff mechanism.

The point at which cutoff is to occur is determined by energization and de-energization of a pair of clutches and one or more brake units which initiate movement of the auxiliary frame 29 on which the saw blade 93 is mounted for movement at the same speed as the material to be cut, and thereafter energization of the saw to swing the saw blade so as to cut through the material at the correct length. These functions are performed by the four circuits generally designated as cutoff saw control circuits 159 illustrated in FIG. 8.

The cutoff control circuitry includes a two-dial pulse-operated switching unit for alternately controlling a brake and clutch in the control unit 128 in conjunction with operation of the apparatus. Such a switching unit may be purchased commercially from Warner Electric Brake and Clutch Company, Beloit, Wisconsin, under the trade designation "MCS-117." Also included in the cutoff saw control circuitry is a clutch-brake control unit including a photoelectric relay sold commercially by Farmer Electric Products Co., Inc., Natick, Massachusetts, under the trade designation "TR-4," this unit producing a "one-shot" relay operation operating with a power supply equipped to provide a single torque control dial to effect control of a clutch mechanism for purposes which will hereinafter be explained. A power supply found to be satisfactory is sold commercially by Warner Electric Brake and Clutch Co. under the trade designation "MCS- Other equivalent power supplies may, of course, be used.

Referring to FIGS. 5 and 6, it will there be seen that a light-sensitive photoelectric cell 151 is positioned to receive a light beam 152 emanating from a light source 153. The light source and light sensitive cell are mounted on opposite sides of a discharge conveyor 154 along which a length 156 of the material to be cut is caused to move by the drive rollers 47. It is the function of the photoelectric cell and light source to sense the end of a strip of material to be cut after it has emanated from the forming apparatus a predetermined length. To control the length, the photoelectric cell assembly 151–153 may be moved nearer or farther from the cutoff saw. Interruption of the beam by the end of the strip material initiates movement of the auxiliary frame 29 on which the saw blade is mounted at the same speed as the material to be cut.

Energization of the saw to swing the saw blade so as to cut the material at the correct length is controlled by the circuitry illustrated in FIG. 7. When the light beam is interrupted, the TRB-4 relay previously identified as available commercially from Farmer Electric Products Co., Inc. under the trade designation "TR-4" is actuated, thus closing contacts 157 to complete a circuit through and energize a travel clutch contained in the power unit 128 illustrated in FIG. 2. As previously explained, energization of this travel clutch or power unit 128 initiates rotation of sprocket 126 and therethrough roller chain 124 attached to the auxiliary carriage 29. The auxiliary carriage is thus caused to move longitudinally of the frame at the same rate of movement as the material to be cut.

As soon as the auxiliary carriage starts moving, normally open-cam operated switch 158, preferably supported at some convenient point on the frame, such as guide bar 23, where any movement of the auxiliary carriage causes the normally open switch to be closed, results in energization of the Warner saw head clutch contained in power unit 109, thus causing shaft 64 to rotate rapidly by virtue of its connection through belt 106 to the electric motor 102. Energization of the Warner saw head clutch unit is in most instances momentary, resulting perhaps in no more than one complete revolution of the cantilever saw blade support arm about the shaft 67. It will be remembered that sprocket 77 mounted on shaft 67 is connected by roller chain 78 to sprocket 116 splined to shaft 64.

Thus, the only time that sprocket 77 rotates is when shaft 64 is caused to rotate momentarily by energization of the Warner head clutch assembly. Before the saw blade support arm 84 has made one complete orbital swing about shaft 67, the saw head switch 159, preferably a cam-operated unit, is mechanically actuated by the support arm 84 to switch the electronic circuitry of the Warner controls so that the saw-control clutch is disengaged and a saw head brake (not shown) is simultaneously imposed to thus bring the saw head to an abrupt stop.

The saw head switch is preferably positioned at an appropriate point on the frame so that as the saw head support arm orbits about shaft 67 it mechanically trips the switch into its closed position. Actuation of the saw head switch also turns to "off" condition the latch to the TRB photocontrol relay and energizes this relay. As soon as the photocontrol relay is deenergized, the travel clutch contained in power unit 128 is also deenergized and a heavy coil spring 161 (FIG. 2) returns the auxiliary carriage carrying the saw blade to its original position. The frame switch 158 is cam-actuated during this return motion, but there is no responsive reaction by the saw head clutch because the TRB relay contacts 1-3 (FIG. 8) are open. Safety switch 162 is provided in the TRB relay circuit to automatically return the auxiliary frame to its initial position if a malfunction occurs in the head switch or if the saw motor is not working.

From the foregoing, it will be seen that close and accurate control of movement of the auxiliary carriage 29 and the saw head carried thereby is effected through the control mechanisms provided. It will also be understood that many different widths of material passing through the cutoff mechanism may be effectively cut by the saw, the only limitation being the maximum chord subtended by the orbital arc made by the saw as it moves around the shaft 67 as an axis of rotation. Obviously, the effective chord of this arc may be varied by increasing the diameter of the saw blade 93 and/or increasing the length of the support plates 82 and 88 so as to lengthen the orbital arm carrying the saw blade.

While the specification has been described in connection with the cutoff function being performed on elongated strip material, it should be understood that many other type materials may be cut through utilization of this mechanism.

Having thus described my invention, what is claimed to be novel and sought to be protected by letters patent is as follows:

1. An automatic cutoff mechanism for cutting without interruption elongated strip material to predetermined lengths while said elongated strip material moves in the direction of its length at a predetermined rate, comprising:
   a. a main support frame including a conveyor means for supporting and guiding said elongated strip material prior to its being cut;
   b. auxiliary carriage means mounted on the main frame and selectively movable thereon at a rate equal to the rate of movement of said strip material through said main frame;
   c. cutoff means mounted on said auxiliary carriage means and movable therewith in relation to said main frame at the same rate as said strip material, said cutoff means including a cantilever arm pivoted at one end on said auxiliary carriage and having a cutoff blade rotatably mounted on its free end for selective orbital movement in relation to said auxiliary carriage, said cutoff blade being adapted to cut through said strip material during a portion of its orbital movement;
   d. control means operatively associated with said auxiliary carriage means and cutoff means and correlated to movement of a predetermined length; and,
   e. said main frame further including a power generating section and a power utilization section, electric motor means supported in said power generating section, selectively engaging power transfer means supported in said power generating section and connected with said electric motor means, said power transfer means including a selectively engaging and disengaging clutch for transmitting or interrupting transmission of power by said power transfer means, continuously rotatable shaft means coupled to said electric motor means and extending into said power utilization section of said main frame, selectively rotatable shaft means coupled to said power transfer means and rotatable when the clutch therein is engaged, said shaft extending into said power utilization section, means connecting said continuously rotatable shaft to said cutoff blade to effect continuous rotation thereof, and means connecting said selectively rotatable shaft to said cantilever arm of the cutoff means to effect selective orbital movement thereof.

2. The combination according to claim 1, in which orbital movement of said cantilever arm is initiated when said means for sensing the forward edge of the moving strip to be cut is activated thereby.

* * * * *